United States Patent
Huang et al.

(10) Patent No.: US 7,586,441 B2
(45) Date of Patent: Sep. 8, 2009

(54) METHODS AND APPARATUSES FOR SEARCHING FOR SATELLITE SIGNALS

(75) Inventors: Kung-Shuan Huang, Changhua County (TW); Wen-Cheng Lai, Tai-Chung (TW); Hsin-Chung Yeh, Hsinchu (TW)

(73) Assignee: Mediatek Inc., Hsin-Chu (TW)

( * ) Notice: Subject to any disclaimer, the term of this patent is extended or adjusted under 35 U.S.C. 154(b) by 320 days.

(21) Appl. No.: 11/769,687

(22) Filed: Jun. 27, 2007

(65) Prior Publication Data
US 2009/0002233 A1 Jan. 1, 2009

(51) Int. Cl.
*G01S 1/00* (2006.01)
(52) U.S. Cl. .................................. 342/357.15
(58) Field of Classification Search ...............
342/357.01–357.17
See application file for complete search history.

(56) References Cited
U.S. PATENT DOCUMENTS 4,578,678 A * 3/1986 Hurd .................. 342/357.12
2006/0111840 A1 * 5/2006 van Diggelen ............ 701/215
2007/0205941 A1 * 9/2007 Riley et al. ............ 342/357.12
2008/0062039 A1 * 3/2008 Cohen et al. ........... 342/357.01

* cited by examiner

*Primary Examiner*—Thomas H Tarcza
*Assistant Examiner*—Nga X Nguyen
(74) *Attorney, Agent, or Firm*—Winston Hsu

(57) ABSTRACT

Methods and apparatuses for searching for satellite signals are provided. One of the proposed methods of searching for satellite signals includes: searching for satellite signals according to measurement predictions; searching for satellite signals of a reference satellite without referring to the measurement predictions; determining if measurements derived from the reference satellite are consistent with the measurement predictions; and searching for satellite signals of other satellites without referring to the measurement predictions if the measurements derived from the reference satellite are determined to be inconsistent with the measurement predictions. If the measurements derived from the reference satellite are determined to be inconsistent with the measurement predictions, navigation information for use in the generation of the measurement predictions is determined to be stale.

23 Claims, 3 Drawing Sheets

METHODS AND APPARATUSES FOR SEARCHING FOR SATELLITE SIGNALS

BACKGROUND

The present invention relates to global navigation satellite systems (GNSS), and more particularly, to methods and apparatuses for searching satellite signals.

Global navigation satellite systems (GNSS), such as Global Position System (GPS), Galileo, or GLONASS, are widely used in many applications. A GNSS receiver can determine its position by receiving and analyzing coded signals transmitted from a plurality of orbiting satellites. The amount of time it takes for the GNSS receiver to search for satellite signals and determine the initial position is called the time to first fix (TTFF). The TTFF is an important criterion for evaluating the performance of a GNSS receiver.

In order to reduce the TTFF, the GNSS receiver usually stores some navigation information (e.g. receiver position, time, ephemeris, almanac, receiver clock drift, receiver velocity, etc.) in a non-volatile memory unit. When activated, the GNSS receiver computes predictions of satellite measurements according to the navigation information stored in the memory unit. The predictions typically include satellites in-view, Doppler, and code chip phase. Ideally, these predictions can assist the GNSS receiver in searching for satellite signals to reduce the TTFF.

Unfortunately, the GNSS receiver may fail to achieve TTFF if it is under unfriendly RF conditions. As is well known, the GNSS receiver may be impossible to achieve a position fix in a building, a basement, and urban canyons, which are really RF-shadowed environments. In addition, if the navigation information stored in the memory unit is not consistent with the real operating conditions of the GNSS receiver, the GNSS receiver may also fail to achieve TTFF. For example, the previously obtained position stored in the memory unit is in the Southern Hemisphere while the GNSS receiver is actually in the Northern Hemisphere. Such inconsistency leads the GNSS receiver to generate incorrect measurement predictions, and the GNSS receiver may continue to search for satellites that lie below the horizon based on such incorrect measurement predictions. In these cases, the GNSS receiver cannot achieve a position fix.

If the GNSS receiver fails to achieve TTFF because the measurement predictions are incorrect, then the incorrect measurement predictions should be discarded. If, however, the GNSS receiver fails to achieve TTFF because the GNSS receiver is in an unfriendly RF environment then the measurement predictions should not be discarded. In the related art, however, it is difficult to identify the environment and why the GNSS receiver fails to achieve TTFF.

SUMMARY

It is therefore an objective of the present disclosure to provide methods and apparatuses for searching for satellite signals to reduce the time to first fix (TTFF).

An exemplary embodiment of a method for searching for satellite signals is disclosed comprising: searching for satellite signals according to measurement predictions; searching for satellite signals of a reference satellite without referring to the measurement predictions; determining if measurements derived from the reference satellite are consistent with the measurement predictions; and searching for satellite signals of other satellites without referring to the measurement predictions if the measurements derived from the reference satellite are determined to be inconsistent with the measurement predictions.

An exemplary embodiment of a GNSS receiver is disclosed comprising: a storage module for storing measurement predictions; a first channel set for searching for satellite signals according to the measurement predictions; a second channel set for searching for satellite signals of a reference satellite without referring to the measurement predictions; and a controller, coupled to the storage module and the second channel set, for determining if measurements derived from the reference satellite are consistent with the measurement predictions; wherein if the measurements derived from the reference satellite are determined to be inconsistent with the measurement predictions, the controller controls the first and second channel sets to search for satellite signals of other satellites without referring to the measurement predictions.

An exemplary embodiment of a method for verifying navigation information in a GNSS receiver is disclosed comprising: generating measurement predictions according to the navigation information; searching for satellite signals according to the measurement predictions; searching for satellite signals of a reference satellite without referring to the measurement predictions; determining if measurements derived from the reference satellite are consistent with the measurement predictions; getting navigation information or measurement predictions from a network or base station; and deducing that the navigation information is stale if the measurements derived from the reference satellite are determined to be inconsistent with the measurement predictions.

An exemplary embodiment of a machine-readable medium containing executable program code is disclosed. When the executable program code executed by a GNSS receiver being stored with navigation information, the GNSS receiver performs operations comprising: generating measurement predictions according to the navigation information; searching for satellite signals according to the measurement predictions; searching for satellite signals of a reference satellite without referring to the measurement predictions; determining if measurements derived from the reference satellite are consistent with the measurement predictions; and searching for satellite signals of other satellites without referring to the measurement predictions if the measurements derived from the reference satellite are determined to be inconsistent with the measurement predictions.

These and other objectives of the present invention will no doubt become obvious to those of ordinary skill in the art after reading the following detailed description of the preferred embodiment that is illustrated in the various figures and drawings.

DETAILED DESCRIPTION

Certain terms are used throughout the description and following claims to refer to particular components. As one skilled in the art will appreciate, electronic equipment manufacturers may refer to a component by different names. This document does not intend to distinguish between components that differ in name but not in function. In the following description and in the claims, the terms "include" and "comprise" are used in an open-ended fashion, and thus should be interpreted to mean "include, but not limited to . . . ". Also, the term "couple" is intended to mean either an indirect or direct electrical connection. Accordingly, if one device is coupled to another device, that connection may be through a direct electrical connection, or through an indirect electrical connection via other devices and connections.

Figure 1:
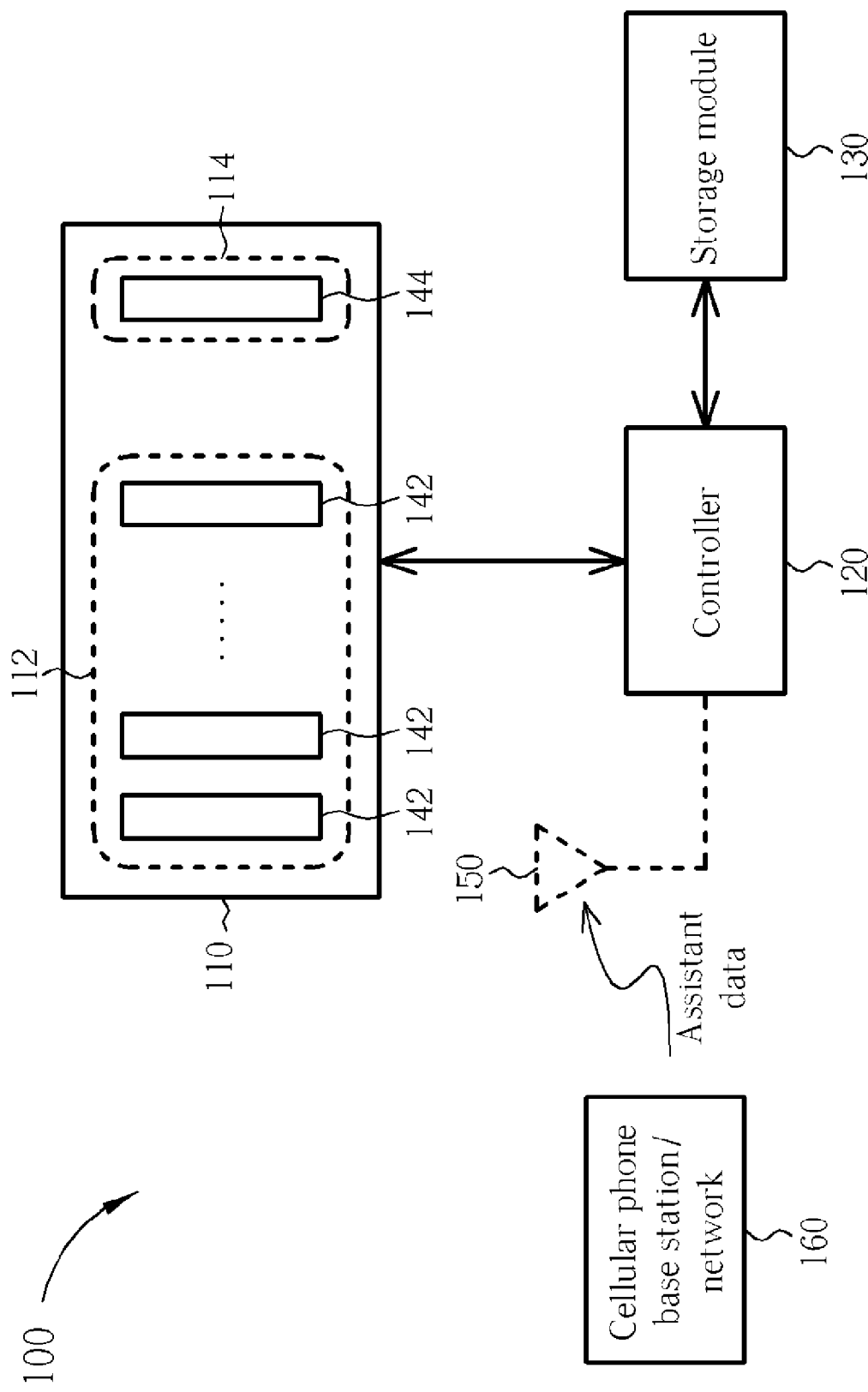
FIG. 1 is a simplified block diagram of a global navigation satellite system (GNSS) receiver according to an exemplary embodiment.

Please refer to FIG. 1, which shows a simplified block diagram of a multi-channel GNSS (global navigation satellite system) receiver 100 according to an exemplary embodiment. In practice, the GNSS receiver 100 may be a GPS receiver, a Galileo receiver, a GLONASS receiver, or a receiver of other global navigation satellite systems. The GNSS receiver 100 comprises a first receiving module 110, a controller 120 coupled to the first receiving module 110, and a storage module 130 coupled to the controller 120. As shown in FIG. 1, the first receiving module 110 comprises a first channel set 112 and a second channel set 114, wherein the first channel set 112 has more channels than the second channel set 114. For example, in this embodiment, the first channel set 112 has a plurality of channels each denoted as 142, while the second channel set 114 has one channel denoted as 144. Of course, the second channel set 114 may have more than one channel in practical implementations.

In the GNSS receiver 100, the first receiving module 110 is arranged for searching for satellite signals. The controller 120 is arranged for computing navigation data (such as position, velocity, time, etc.) according to the satellite signals acquired by the first receiving module 110. Additionally, the storage module 130 is utilized for storing navigation information and is typically implemented with a non-volatile memory.

Please note that the term "navigation information" as used herein encompasses various data of information that can be used to generate measurement predictions for assisting the GNSS receiver 100 in acquisition of satellite signals. For example, the navigation information may comprise a receiver position, time, ephemeris, almanac, receiver clock drift, a receiver velocity, etc., and the measurement predictions typically comprise a satellite search list, a Doppler center, a Doppler search range, a code chip center, a code chip search range, a receiver position, time, and/or a clock bias (e.g., a temperature-compensated crystal oscillator (TCXO) bias). In practice, the navigation information may be generated by the controller 120 in previous positioning operations, or received from external data sources. For example, in a preferred embodiment, the GNSS receiver 100 further comprises a second receiving module 150, coupled to the controller 120, for receiving assistant data carrying navigation information from a cellular phone base station or network 160. In this case, the controller 120 extracts navigation information from the received assistant data.

Hereinafter, the satellite signal acquisition operations of the GNSS receiver 100 will be explained in further detail with reference to FIG. 2.

Figure 2:
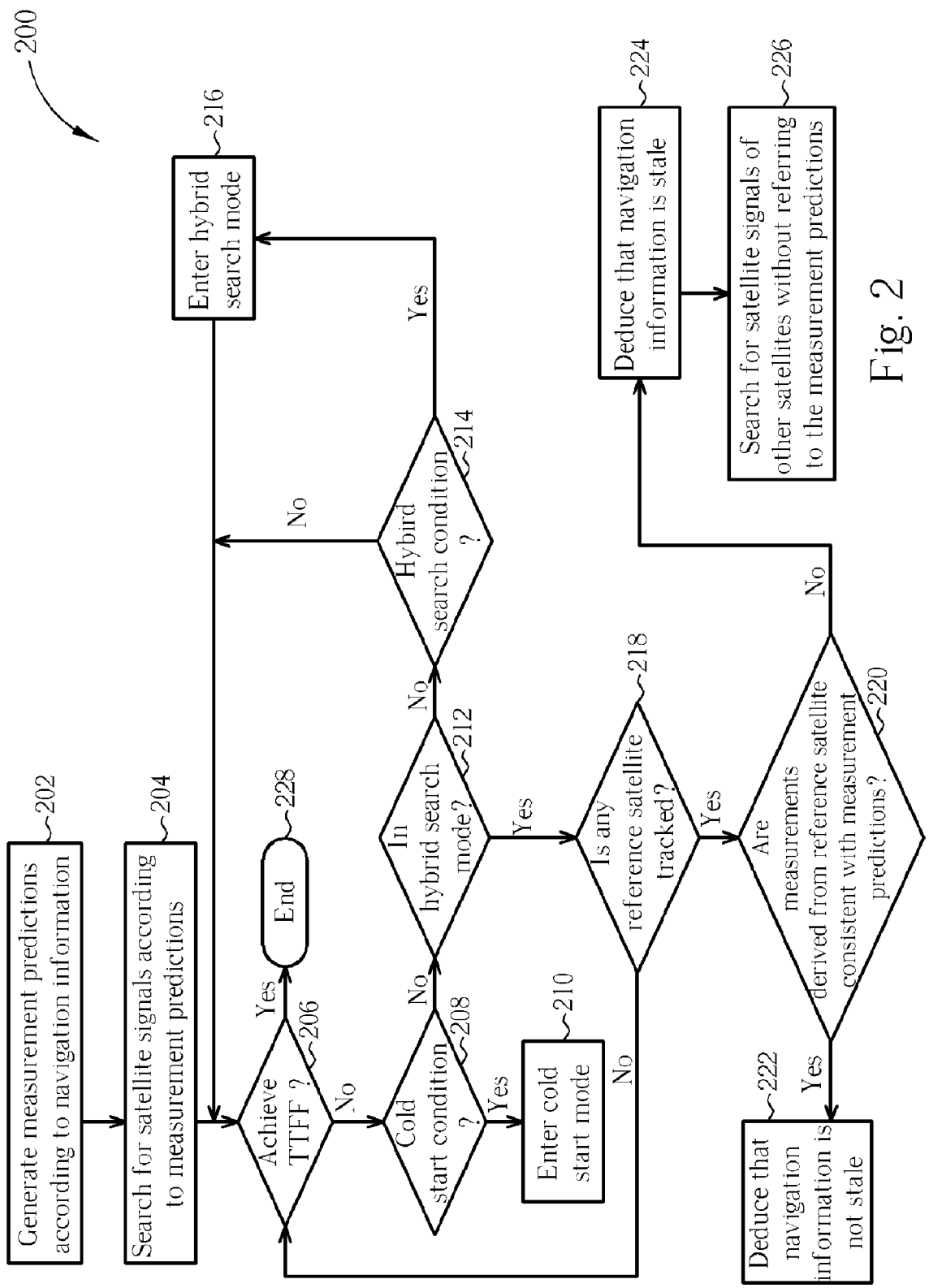
FIG. 2 is a flowchart illustrating a method for searching satellite signals according to a first embodiment of the present invention.

FIG. 2 is a flowchart 200 illustrating a method for searching for satellite signals according to a first embodiment of the present invention. When activated, the controller 120 performs step 202 to generate measurement predictions (e.g. a satellite search list, a Doppler center, a Doppler search range, a code chip center, a code chip search range, a receiver position, time, and/or a clock bias) according to the navigation information stored in the storage module 130. Generally, the measurement predictions are then stored in the storage module 130.

In step 204, the first receiving module 110 searches for satellite signals according to the measurement predictions generated by the controller 120. In practice, the first receiving module 110 may utilize all the channels or most channels (e.g. the first channel set 112) to search for satellite signals according to the measurement predictions.

In step 206, the controller 120 determines if the TTFF is achieved. If the TTFF is achieved (i.e. a position fix is obtained), the controller 120 ends the satellite signal acquisition operation (step 228). If the TTFF is not yet achieved (i.e. a position fix is not yet obtained), the controller 120 performs step 208 to determine if a cold start condition is satisfied. In one embodiment, the cold start condition is determined to be satisfied if the first receiving module 110 operates over a first predetermined period but no satellite signal is acquired. If the cold start condition is satisfied, the first receiving module 110 enters a "cold start mode" (step 210) to search for satellite signals without referring to any measurement predictions. This operation is also referred to as "full sky search".

If the TTFF is not yet achieved, and the cold start condition is not satisfied, the controller 120 performs step 212 to determine if the first receiving module 110 is in a "hybrid search mode". The details of operations in the "hybrid search mode" will be described later. If the first receiving module 110 does not operate in the "hybrid search mode", the controller 120 performs step 214 to check if a hybrid search condition is satisfied.

In this embodiment, the hybrid search condition is determined to be satisfied if the first receiving module 110 operates over a second predetermined period but no satellite signal is acquired, wherein the second predetermined period is shorter than the first predetermined period. If it is found that the hybrid search condition is not satisfied in step 214, the operating flow of the GNSS receiver 100 goes back to step 206. On the other hand, if it is found that the hybrid search condition is satisfied in step 214, the first receiving module 110 performs step 216 to enter a "hybrid search mode". Please note that, in an alternative design, the hybrid search condition could be determined to be satisfied if the first receiving module 110 operates over the second predetermined period, regardless of acquisition of satellite signals. This also obeys the spirit of the present invention.

In the "hybrid search mode", the controller 120 selects a subset of the total channels of the first receiving module 110 to search for satellite signals of one or more reference satellites, whose signals could be received by the GNSS receiver, a network, a base station or other equipments, without referring to any measurement predictions, while other channels of the first receiving module 110 continue the operations of step 204 (i.e. searching for satellite signals according to the measurement predictions). For example, the controller 120 of this embodiment selects the second channel set 114 of the first receiving module 110 to search for satellite signals of at least one reference satellite without referring to any measurement predictions, while the first channel set 112 of the first receiving module 110 searches for satellite signals according to the measurement predictions. In one aspect, the second channel set 114 performs the "full sky search" in the hybrid search mode.

After entering the hybrid search mode, if the cold start condition is not satisfied and the TTFF is not yet achieved, the operating flow of the GNSS receiver 100 proceeds to step 218 to check if any reference satellite is tracked. If there is no reference satellite being tracked by the second channel set 114, the operating flow of the GNSS receiver 100 goes back to step 206. On the other hand, if at least one reference satellite is being tracked by the second channel set 114, the controller 120 derives measurements from satellite signals of the reference satellite received by the second channel set 114, and then performs step 220.

In step 220, the controller 120 determines if the measurements derived from the reference satellite are consistent with the measurement predictions stored in the storage module 130. For example, the controller 120 may compare the satellite search list, Doppler, code chip phase, or other measurements derived from the reference satellite with those in the measurement predictions.

If the measurements derived from the reference satellite are found consistent with the measurement predictions in step 220, the controller 120 performs step 222 to deduce that the measurement predictions are correct. As described previously, the measurement predictions are generated based on the navigation information stored in the storage module 130, so the controller 120 also deduces in step 222 that the navigation information stored is not stale. Under such a situation, the controller 120 can deduce that the reason the GNSS receiver 100 cannot obtain a position fix is that the GNSS receiver 100 may be in an unfriendly RF environment. In one embodiment, the operating flow of the GNSS receiver 100 then goes back to step 206 when the controller 120 deduces that the navigation information is not stale. In another embodiment, the first receiving module 110 leaves the hybrid search mode, and utilizes all channels to search for satellite signals based on the measurement predictions.

If the measurements derived from the reference satellite are found inconsistent with the measurement predictions in step 220, the controller 120 performs step 224 to deduce that the measurement predictions are wrong and the navigation information stored in the storage module 130 is stale.

The controller 120 then performs step 226 to control the first receiving module 110 to search for satellite signals of other satellites without referring to the measurement predictions. In one embodiment, the first receiving module 110 leaves the hybrid search mode and enters the cold start mode in step 226. In another embodiment, the controller 120 updates the measurement predictions stored in the storage module 130 with the measurements derived from the reference satellite, and controls the first and second channel sets 112 and 114 to search for satellite signals of other satellites with reference to the measurements derived from the reference satellite in order to speed up the satellite signal acquisitions in step 226.

As in the previous descriptions, the controller 120 verifies the navigation information stored in the storage module 130 by comparing the measurement predictions with the measurements derived from the reference satellite. Once the navigation information is determined to be stale, the measurement predictions derived from the navigation information are no longer used in order to prevent misguiding of the satellite signal acquisitions of the first receiving module 110. As a result, the incorrect measurement predictions will not cause the GNSS receiver 100 to fail to achieve TTFF, thereby improving the TTFF of the GNSS receiver 100.

Figure 3:
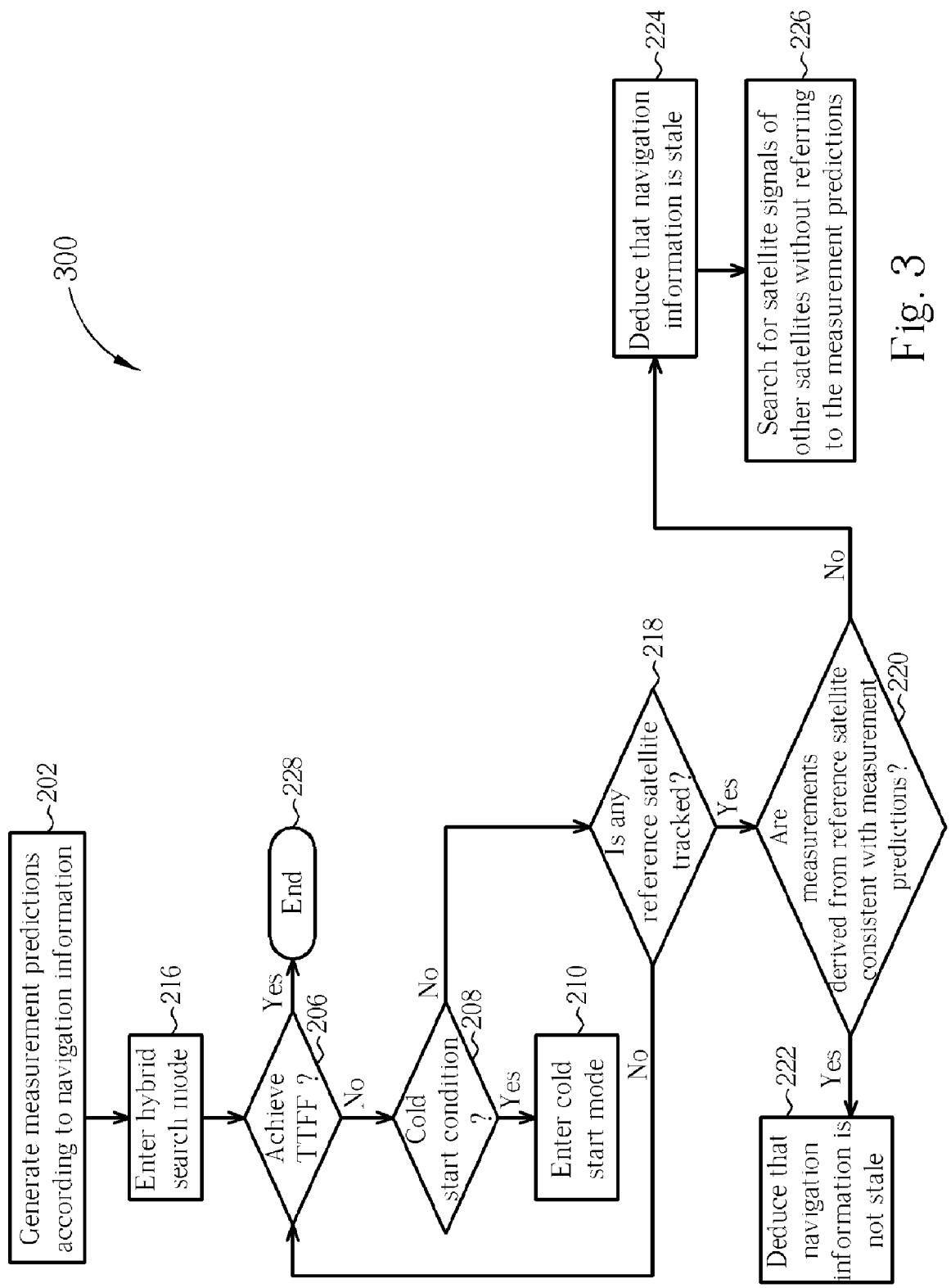
FIG. 3 is a flowchart illustrating a method for searching satellite signals according to a second embodiment of the present invention.

It should be noted that the executing order of the steps in the flowchart 200 is merely an example rather than a restriction of the practical implementations. For example, FIG. 3 shows a flowchart 300 illustrating a method for searching for satellite signals according to a second embodiment of the present invention. The flowchart 300 is similar to the flowchart 200, and steps having the same operations are labeled the same for the sake of clarity.

As illustrated in the flowchart 300, after the controller 120 generates the measurement predictions according to the navigation information (step 202), the first receiving module 110 of this embodiment directly enters the hybrid search mode (step 216). For example, the first receiving module 110 may utilize the first channel set 112 to search for satellite signals according to the measurement predictions, and simultaneously utilize the second channel set 114 to search for satellite signals of at least one reference satellite without referring to the measurement predictions. Please note that the second channel set 114 may begin to search for satellite signals of the reference satellite before the measurement predictions are generated. The operations of other steps in the flowchart 300 are substantially the same as those in the flowchart 200, and further details are therefore omitted herein for the sake of brevity.

In practice, the disclosed methods of searching for satellite signals and methods of verifying the navigation information can be implemented with software means. For example, the GNSS receiver 100 may be provided with a machine-readable medium (e.g. a non-volatile memory; not shown) containing proper designed executable program code, which, when executed by the GNSS receiver 100, causes the GNSS receiver 100 to perform the aforementioned satellite signal acquisition operations.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A method for searching satellite signals, comprising:
searching for satellite signals according to measurement predictions;
searching for satellite signals of a reference satellite without referring to the measurement predictions;
determining if measurements derived from the reference satellite are consistent with the measurement predictions; and
searching for satellite signals of other satellites without referring to the measurement predictions if the measurements derived from the reference satellite are determined to be inconsistent with the measurement predictions.

2. The method of claim 1, wherein the step of searching for satellite signals according to the measurement predictions and the step of searching for satellite signals of the reference satellite are performed concurrently.

3. The method of claim 2, wherein the step of searching for satellite signals of the reference satellite begins when the step of searching for satellite signals according to the measurement predictions is performed over a predetermined period.

4. The method of claim 1, wherein the step of searching for satellite signals of other satellites comprises:
searching for satellite signals with reference to the measurements derived from the reference satellite.

5. The method of claim 1, wherein the measurement predictions comprise a satellite search list, a Doppler center, a Doppler search range, a code chip center, a code chip search range, a receiver position, time, or a clock bias.

6. A GNSS receiver, comprising:
a storage module for storing measurement predictions;
a first channel set for searching for satellite signals according to the measurement predictions;

a second channel set for searching for satellite signals of a reference satellite without referring to the measurement predictions; and a controller, coupled to the storage module and the second channel set, for determining if measurements derived from the reference satellite are consistent with the measurement predictions;

wherein if the measurements derived from the reference satellite are determined to be inconsistent with the measurement predictions, the controller controls the first and second channel sets to search for satellite signals of other satellites without referring to the measurement predictions.

7. The GNSS receiver of claim 6, wherein the second channel set searches for satellite signals of the reference satellite while the first channel set searches for satellite signals according to the measurement predictions.

8. The GNSS receiver of claim 7, wherein the second channel set begins to search for satellite signals of the reference satellite when the first channel set searches for satellite signals over a predetermined period but no satellite signal is acquired.

9. The GNSS receiver of claim 8, wherein the second channel set is a subset of the first channel set.

10. The GNSS receiver of claim 6, wherein if the measurements derived from the reference satellite are determined to be inconsistent with the measurement predictions, the controller controls the first and second channel sets so that the first and second channel sets also search for satellite signals of other satellites with reference to the measurements derived from the reference satellite.

11. The GNSS receiver of claim 6, wherein the first channel set has more channels than the second channel set.

12. The GNSS receiver of claim 6, wherein the measurement predictions comprise a satellite search list, a Doppler center, a Doppler search range, a code chip center, or a code chip search range.

13. The GNSS receiver of claim 6, wherein if the measurements derived from the reference satellite are determined to be inconsistent with the measurement predictions, the controller updates the measurement predictions stored in the storage module with the measurements derived from the reference satellite.

14. The GNSS receiver of claim 6, wherein the controller generates the measurement predictions according to navigation information.

15. The GNSS receiver of claim 14, wherein if the measurements derived from the reference satellite are determined to be inconsistent with the measurement predictions, the controller deduces that the navigation information is stale.

16. The GNSS receiver of claim 14, wherein the navigation information comprises a receiver position, time, ephemeris, almanac, receiver clock drift, or a receiver velocity.

17. The GNSS receiver of claim 6, wherein the second channel set searches one or more reference satellites, whose signals are received by the GNSS receiver, a network, or a base station.

18. A method for verifying navigation information in a GNSS receiver, comprising:
generating measurement predictions according to the navigation information;
searching for satellite signals according to the measurement predictions;
searching for satellite signals of a reference satellite without referring to the measurement predictions;
determining if measurements derived from the reference satellite are consistent with the measurement predictions; and
deducing that the navigation information is stale if the measurements derived from the reference satellite are determined to be inconsistent with the measurement predictions.

19. The method of claim 18, wherein the step of searching for satellite signals according to the measurement predictions and the step of searching for satellite signals of the reference satellite are performed concurrently.

20. The method of claim 19, wherein the step of searching for satellite signals of the reference satellite begins when the step of searching for satellite signals according to the measurement predictions is performed over a predetermined period.

21. The method of claim 18, wherein the navigation information comprises a receiver position, time, ephemeris, almanac, receiver clock drift, or a receiver velocity.

22. The method of claim 18, wherein the measurement predictions comprise a satellite search list, a Doppler center, a Doppler search range, a code chip center, a code chip search range, a receiver position, time, or a clock bias.

23. A machine-readable medium containing executable program code, which, when executed by a GNSS receiver stored with navigation information, causes the GNSS receiver to perform operations comprising:
generating measurement predictions according to the navigation information;
searching for satellite signals according to the measurement predictions;
searching for satellite signals of a reference satellite without referring to the measurement predictions;
determining if measurements derived from the reference satellite are consistent with the measurement predictions; and
searching for satellite signals of other satellites without referring to the measurement predictions if the measurements derived from the reference satellite are determined to be inconsistent with the measurement predictions.

* * * * *